US007656789B2

(12) United States Patent
Alves et al.

(10) Patent No.: US 7,656,789 B2
(45) Date of Patent: Feb. 2, 2010

(54) METHOD, SYSTEM AND STORAGE MEDIUM FOR REDUNDANT INPUT/OUTPUT ACCESS

(75) Inventors: Luiz C. Alves, Hopewell Junction, NY (US); Daniel F. Casper, Poughkeepsie, NY (US); Steven G. Glassen, Wallkill, NY (US); Daniel J. Stigliani, Jr., Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 11/092,033

(22) Filed: Mar. 29, 2005

(65) Prior Publication Data

US 2006/0221818 A1  Oct. 5, 2006

(51) Int. Cl.
  *H04L 12/26* (2006.01)
(52) U.S. Cl. ............... 370/220; 370/236; 370/247; 370/355
(58) Field of Classification Search .......... 370/217, 370/221, 242
  See application file for complete search history.

(56) References Cited

U.S. PATENT DOCUMENTS

| | | | | |
|---|---|---|---|---|
| 4,607,365 A | * | 8/1986 | Greig et al. | 714/4 |
| 5,001,671 A | * | 3/1991 | Koo et al. | 365/230.05 |
| 5,793,746 A | * | 8/1998 | Gerstel et al. | 370/228 |
| 5,819,112 A | | 10/1998 | Kusters | 395/856 |
| 6,286,060 B1 | | 9/2001 | DiGiorgio et al. | 710/31 |
| 6,345,310 B1 | | 2/2002 | Allison et al. | 709/250 |
| 7,137,030 B2 | * | 11/2006 | Jung et al. | 714/13 |
| 7,450,529 B2 | * | 11/2008 | Amirichimeh et al. | 370/304 |
| 2002/0162045 A1 | * | 10/2002 | Shiragaki | 714/4 |
| 2004/0114412 A1 | | 6/2004 | Wu | 365/63 |
| 2004/0202105 A1 | * | 10/2004 | Jones et al. | 370/228 |

OTHER PUBLICATIONS

J. Von Buttlar et al z/CECSIM: An efficient and comprehensive microcode simulator for the IBM eServer z900;, IBM Journal of Research and Development pp. 607-615, vol. 46 No. 4/5, 2002.*

* cited by examiner

*Primary Examiner*—Seema S Rao
*Assistant Examiner*—Henry Baron
(74) *Attorney, Agent, or Firm*—Cantor Colburn LLP; Arthur Ortega

(57) ABSTRACT

A system, method and storage medium for providing redundant I/O access between a plurality of interconnected processor nodes and I/O resources. The method includes determining whether a primary path between the interconnected processor nodes and the I/O resources is operational, where the primary path includes a first processor node and a primary multiplexer. If the primary path is operational, the transactions are routed via the primary path. If the primary path is not operational, the transactions are routed between the interconnected processor nodes and the I/O resources via an alternate path that includes a second processor node and an alternate multiplexer.

19 Claims, 4 Drawing Sheets

METHOD, SYSTEM AND STORAGE MEDIUM FOR REDUNDANT INPUT/OUTPUT ACCESS

TRADEMARKS

IBM® is a registered trademark of International Business Machines Corporation, Armonk, N.Y., U.S.A. S/390, eServer and other names used herein may be registered trademarks, trademarks or product names of International Business Machines Corporation or other companies.

BACKGROUND OF THE INVENTION

The invention relates to redundant access to I/O resources, which contain I/O adapters and associated support functions that provide connection to external I/O attachments (e.g. DASD, tape, LAN switches) and, in particular to a method, system and storage medium for providing a concurrent I/O hardware infrastructure that includes redundant I/O access to and from the I/O resources.

Computer or server systems may be built from common building blocks (called nodes or books) that are interconnected via a high speed bus or buses and have the capability to be configured as a single computer system. Each node contains processors, memory, I/O hub cards and an interconnection fabric to the I/O hardware subsystem as well as to the other nodes. A single node with I/O attachments (e.g., storage devices and network devices) connected via I/O resources (e.g., adapters and virtualization engines) through the I/O hubs, can be operated as a stand-alone computer. Additional nodes, for more computing power, can be added to the computer system as required by workload without buying a separate server. These nodes, collectively, comprise a multiple node mainframe and, in general, are configured as a large single system image. When configured in this manner, each node may access I/O attachments via the I/O resources attached to any of the nodes even though the accessing node has no direct connection to these resources. This capability is provided by exploiting the normal node to node communication path that is necessary for memory operations in this configuration.

Computer and/or server systems of this nature may also have a requirement for high availability and concurrent maintenance. When a node fails or maintenance operations impact a node for either upgrade (i.e. plugging additional memory modules) or for a repair (i.e. replacing a defective part), this may result in other nodes losing access to the I/O resources attached to the impacted node unless a redundant path to those resources is provided.

Another advantage of the redundant path is to allow continued access to the I/O resources when a failure occurs in the path that attaches the I/O resources. The server may be designed such that transparent recovery occurs without human intervention or impact to I/O operations in progress.

At least one current server design (e.g., z990 from IBM) that may be utilized to implement concurrent upgrade, repair, and/or recovery of a node in a multiple node machine requires that the I/O resources directly attached to the affected node be no longer usable by the other nodes during the service action. This is because the connection is broken to the I/O resources when the node or intervening path is not operational.

One way of getting around this is to place a switch fabric between the processor nodes and the I/O resources to allow any node to connect to any I/O resource. Since a single switch fabric would be a single point of failure, a second switch fabric would be necessary to provide a redundant path. This solution is expensive because it requires physical resources (power, space, etc.) to support the additional hardware, management firmware, and an additional interface layer between the processor and I/O port. The additional switch hardware and firmware between the processor node and the I/O port may adversely affect I/O performance.

It would be desirable to be able to have a cost effective and simplified manner of implementing concurrent upgrade and repair of a node in a multiple node machine such that the I/O resources directly attached to the affected node are usable by the other nodes, during the upgrade, recovery, or repair activity.

BRIEF SUMMARY OF THE INVENTION

Exemplary embodiments of the present invention include a system for providing redundant I/O access. The system includes two or more processor nodes including a first processor node and a second processor node. The processor nodes are interconnected by one or more node interconnects for communicating transactions between the processor nodes. The system also includes a primary multiplexer and an alternate multiplexer. The primary multiplexer includes a primary upstream port adapted for routing the transactions via the first processor node. The primary multiplexer also includes one or more downstream ports adapted for routing the transactions to and from I/O resources corresponding to the first processor node via a primary path. The primary path includes the first processor node, the primary multiplexer and the I/O resources corresponding to the first processor node. The primary multiplexer also includes a primary link port. The alternate multiplexer includes an alternate upstream port adapted for routing the transactions via the second processor node. The alternate multiplexer also includes an alternate link port for routing the transactions to and from the I/O resources corresponding to the first processor node via an alternate path. The alternate path includes the second processor node, the alternate multiplexer, the alternate link port, the primary link port, the primary multiplexer and the I/O resources corresponding to the first processor node. The alternate path may be utilized when the primary path is not operational.

Further exemplary embodiments of the present invention include a method for providing redundant I/O access between a plurality of interconnected processor nodes and I/O resources. The method includes determining whether a primary path between the interconnected processor nodes and the I/O resources is operational, where the primary path includes a first processor node and a primary multiplexer. If the primary path is operational, the transactions are routed via the primary path. If the primary path is not operational, the transactions are routed between the interconnected processor nodes and the I/O resources via an alternate path that includes a second processor node and an alternate multiplexer.

Additional exemplary embodiments include a storage medium for providing redundant I/O access between a plurality of interconnected processor nodes and I/O resources. The storage medium includes instructions for causing a computer to implement a method. The method includes determining whether a primary path between the interconnected processor nodes and the I/O resources is operational, where the primary path includes a first processor node and a primary multiplexer. If the primary path is operational, the transactions are routed via the primary path. If the primary path is not operational, the transactions are routed between the interconnected processor nodes and the I/O resources via an alternate path that includes a second processor node and an alternate multiplexer.

BRIEF DESCRIPTION OF THE DRAWINGS

Referring now to the drawings wherein like elements are numbered alike in the several FIGURES.

DETAILED DESCRIPTION OF THE PREFERRED EMBODIMENTS

Exemplary embodiments of the present invention provide a concurrent I/O hardware infrastructure for a multiple node architecture that allows the I/O resources attached to a node being upgraded or repaired to be utilized by other processor nodes within the multiple node machine. The interconnection network between the processor node and the I/O ports provides the connectivity and bandwidth matching between a limited number of very high bandwidth processor node ports and a large number of I/O ports (e.g., 1,024) that generally have lower bandwidth requirements on a port basis. The central core of this network is a multiplexer chip (I/O bridge) that converts a single high bandwidth port from the I/O hub into four lower bandwidth ports. This infrastructure is designed for z900 and z990 processors as well as other industry servers. Using this approach and cascading the multiplexers allows a sixteen to one (or greater) fan-out of a single high bandwidth processor node port.

Figure 1:
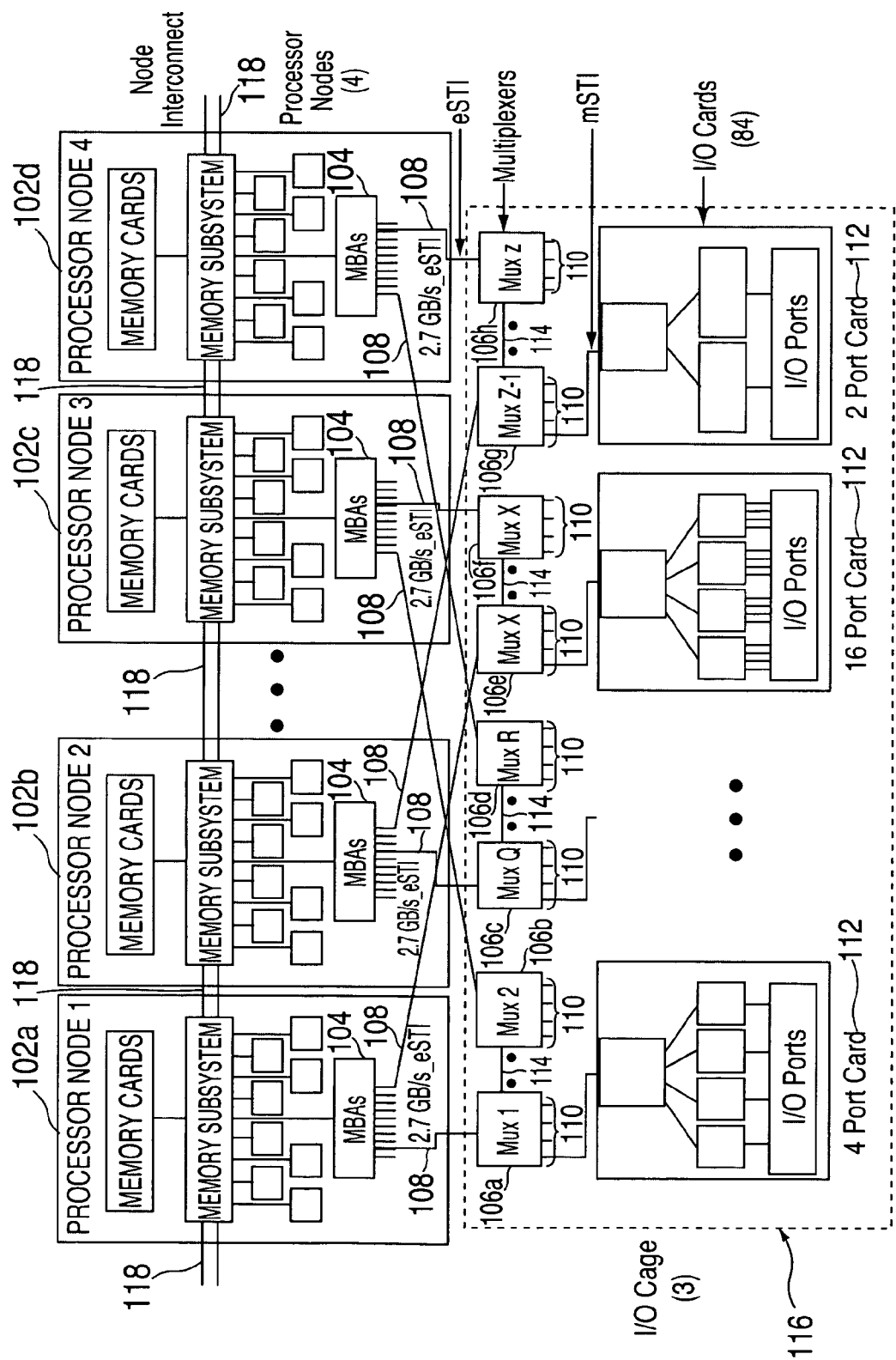
FIG. 1 depicts a block diagram of a system, including an I/O infrastructure, that may be utilized by exemplary embodiments of the present invention.

FIG. 1 depicts a block diagram of a system, including an I/O infrastructure, which may be utilized by exemplary embodiments of the present invention. FIG. 1 includes four processor nodes 102 interconnected by a node interconnect 118: processor node one 102a, processor node two 102b, processor node three 102c and processor node four 102d. Four interconnected processor nodes 102 are depicted in FIG. 1, but any number of processor nodes 102 may be implemented by exemplary embodiments of the present invention. Each processor node 102 includes processors, memory cards, a memory subsystem, a node to node communication interface (i.e., the node interconnect 118), and memory bus adapter (MBA) application specific integrated circuits (ASICs) 104 (also referred to herein as I/O hubs or I/O hub cards). The I/O hubs in each processor node 102 containing the MBA ASICs 104 communicate with the I/O hardware subsystem via one or more enhanced self-timed interface (eSTI) links 108 (e.g., eSTI cables). In FIG. 1, an MBA ASIC 104 is utilized to implement an I/O hub or I/O hub card. Other I/O hub implementations may be utilized with exemplary embodiments of the present invention to generate other interfaces (e.g. InfiniBand and PCI Express). The hub ASICs may also be placed on the node printed circuit board along with the processors and memory. FIG. 1 also includes a plurality of multiplexers 106 (also referred to herein as I/O multiplexer resources or I/O bridges) each connected to one MBA ASIC 104 via an eSTI link 108. Each multiplexer 106 is connected to up to four I/O cards 112 (card group) via a multi-speed self-timed interface (mSTI) 110. Further, each multiplexer 106 includes an alternate port (besides the port in communication with an MBA ASIC 104) for connection to an alternate link 114 to attach to the alternate port of a different multiplexer 106. The alternate port is also referred to herein as a link port.

Exemplary embodiments of the present invention require dual host/upstream ports on the multiplexer chip. The alternate upstream port, or link port, is used to connect two multiplexers 106 together via an alternate link 114. This allows an I/O hub port connected to the primary link of the host multiplexer 106 to access I/O cards 112 attached to another multiplexer 106 through the alternate link 114. For example, referring to the multi-node configuration of FIG. 1, an MBA ASIC 104 in processor node two 102b is attached to the primary port of the "Q" multiplexer 106c. In addition, an MBA ASIC 104 in processor node four 102d is attached to the primary port of the "R" multiplexer 106d. Further, the "Q" multiplexer 106c and the "R" multiplexer 106d are directly attached via an alternate link 114. If processor node four 102d is disconnected from the "R" multiplexer 106d, then any I/O card 112 directly attached to the "R" multiplexer 106d is still available to the remaining processor nodes 102 via processor node two 102b and the alternate link 114 between the "R" multiplexer 106d and the "Q" multiplexer 106c. In this case, the primary multiplexer is that multiplexer directly attached to the I/O card group and the alternate multiplexer is attached to the I/O card group via the alternate link 114. In the exemplary embodiment discussed in this section, the "R" multiplexer 106d is primary and the "Q" multiplexer 106c is the alternate. The roles may be reversed depending on the I/O card group being impacted.

Concurrent node removal refers to the removal of a node in a multi-node system while the overall system, including the I/O hub cards associated with the node in question, are powered up and may be performing I/O traffic operations. In order to fulfill the desired goal of this function, a "controlled evacuation and shutdown" of the active resources on the node is required to be performed concurrently with ongoing customer workloads. The concurrent node removal requires evacuation which involves a controlled and non-disruptive move of the application on the subject node to another node as well as all I/O multiplexers 106 attached to the node to have alternate (redundant) paths to one of the other nodes within the single system image. The alternate path is provided by the node to node connection from the node the application is running on to the node directly attached to the alternate multiplexer which is connected via link 114 in FIG. 1. The node to node connection path is required when the node the application is running on is not directly connected to the alternate multiplexer. In other words, there needs to be another I/O hub, or MBA ASIC 104 (on a different processor node 102 for the concurrent removal scenario) to which the downstream I/O resources (e.g., bridges implemented by multiplexers 106) have a redundant connection. The single system image is a grouping of the system nodes to look like one large system. If the I/O resources, or multiplexers 106 do not fulfill this requirement, then the I/O cards 112 have to be taken off-line and the owning operating system(s) must be able to tolerate the loss or be shut down itself. The node and I/O paths are generally returned to their original state upon completion and verification of the upgrade or repair.

Concurrent removal or reconfiguration of I/O hubs or eSTI links 108 require a subset of functions ("controlled evacuation and shutdown") as required to support the concurrent removal of a node as described herein above. All of the I/O hubs and eSTI links 108 plugged into the processor node 102 must be non-disruptively shut down. The I/O traffic has to be rerouted through other I/O hubs and eSTI links which have been configured as redundant hubs and or eSTI links 108 to the same I/O bridges (e.g., multiplexers 106) and are either available within the node or in another node via the node to node connection. The removal and reconfiguration of an eSTI link 108 follows the same methodology as the I/O hub. This embodiment also enables recovery of I/O transactions when a fault occurs due to a failure of any of the components in the primary path. The recovery is done transparent to the application without human intervention or disruption to I/O transactions in progress.

In exemplary embodiments of the present invention, the redundant I/O access capability is achieved without the addition of another level of interconnection network and the disadvantages associated with the more complex switch fabric. The system and I/O paths are generally returned to their original state upon completion and verification of the repair.

The concurrent I/O infrastructure provides a path from an application running on a processor node 102 to the I/O ports of the server. The downstream ports (e.g., ESCON, Fibre Channel, and Ethernet) provide the system connection to external devices (e.g., DASD, tape, networking and other platforms). The I/O infrastructure depicted in FIG. 1 provides the I/O bandwidth and connectivity via the eSTI links 108 for the processor nodes 102 to the I/O cards 112 that are contained in the I/O cages 116. In an exemplary embodiment of the present invention, the eSTI link 108 data rate is 2.7 gigabytes per second (Gbytes/s) (encoded) and a total of 16 eSTI cables per physical processor node 102 are available. In addition, the eSTI link 108 physical layer is 12 lanes wide in each direction with a line rate of 2.25 gigabauds per second (Gbaud/s) per lane. This approach allows maximum flexibility to convert the eSTI link 108 into the lower speed downstream STI links which connect the I/O card to the multiplexer 106. (e.g. 2.0, 1, or 0.3 gigabyte/s). The 2.7 Gbytes/s eSTI link 108 cable originates in the MBA ASIC 104 on a pluggable card edge of the processor physical node board and is connected to the I/O bridge (multiplexer 106) in the I/O cage 116 via the high speed eSTI links 108. The eSTI links 108 may be implemented in any type of cable medium such as copper and optical. A maximum cable length of 10 meters in copper technology is supported in exemplary embodiments of the present invention to attach any processor node 102 within the frame to the furthest multiplexer card in an I/O cage 116. Longer lengths may also be supported, for example, with fiber optic technology. Three I/O cages 116 are depicted in FIG. 1 and they each contain a maximum of 28 I/O cards 112. Connection to the I/O cards 112 is via embedded printed circuit wiring in the I/O cage 116 midplane board which contains one card connector per slot for each of the I/O cards 112.

In the multi-node configuration depicted in FIG. 1, the upstream ports of each multiplexer 106 are attached to a processor node 102 and the alternate port, or link port, of the alternate multiplexer 106. The downstream ports of each multiplexer are attached to four I/O card slots on the I/O port side. The redundant capability is achieved without doubling the number of processor node attachments by directly connecting a pair of multiplexers 106. In exemplary embodiments of the present invention, the multiplexers 106 are implemented by dual port multiplexer/demultiplexer ASICs.

Figure 2:
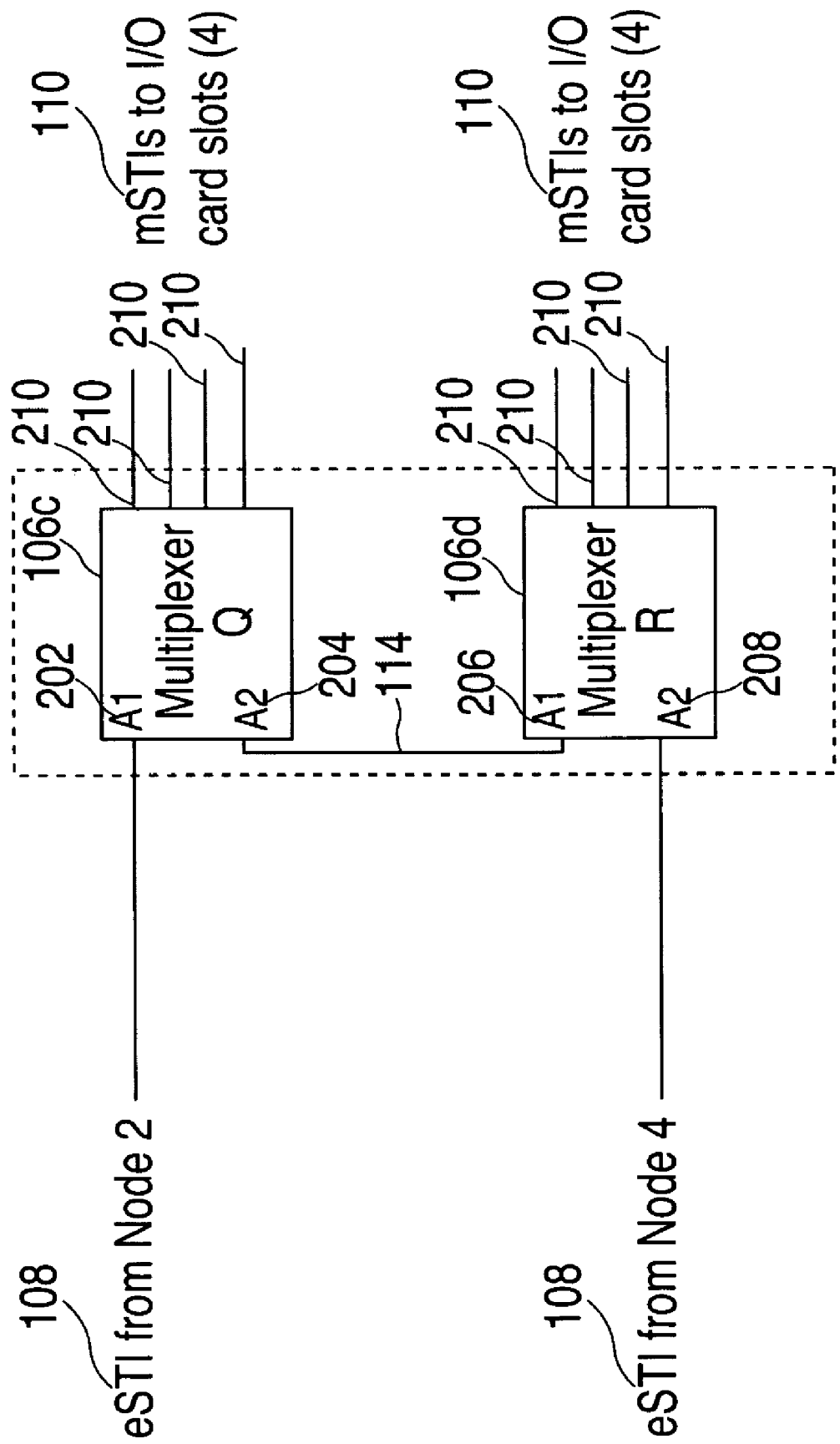
FIG. 2 depicts a block diagram of a configuration of a dual port multiplexer integrated circuit configuration that may be utilized by exemplary embodiments of the present invention.

FIG. 2 depicts a block diagram of a dual port multiplexer 106 configuration that may be utilized by exemplary embodiments of the present invention. The multiplexer 106 is capable of accepting two eSTI links 108, or processor attachments. One function of the "A" ports (e.g., port A1 202 and port A2 208) is to receive the data from an attached processor node 102 thereby enabling the multiplexer 106 to direct the data to the appropriate downstream mSTI ports 110. Port A1 202 and port A2 208 are referred to herein as primary upstream ports. Another function of the "A" ports (e.g., port A2 204 and port A1 206) is to connect to the other "A" port when the other "A" port is directly attached to another multiplexer 106. Port A2 204 and port A1 206 are referred to herein as alternate upstream ports, or link ports. The hardware design of the "A" ports is symmetric and in exemplary embodiments of the present invention, their functionality is configured via firmware.

FIG. 2 illustrates a pair configuration where port A1 202 of the "Q" multiplexer 106c is connected to processor node two 102b and port A2 204 is connected to port A1 206 of the "R" multiplexer 106d. Port A2 208 of the "R" multiplexer 106d, in turn, is connected to processor node four 102d. In exemplary embodiments of the present invention, each multiplexer 106 of the pair supports a set of four I/O cards 112, or I/O slots. The same configuration is also used in the case where only one set of four I/O cards 112, or I/O slots, is supported. In this case, the set of four slots is connected to one or the other multiplexer 106 and only the multiplexer which is connected to the four slots (I/O cards) is always the primary and the other is always the alternate.

According to exemplary embodiments of the present invention, during normal operation, only one "A" port is carrying active data from the processor node 102 (i.e., port A1 202 on the "Q" multiplexer 106c and port A2 208 on the "R" multiplexer 106d). The direct connected or alternate link 114 of the multiplexer ASIC pair does not carry any data traffic during normal operation but is kept active with idle sequence traffic. This insures that this link is operating properly on a continuous basis and is available when needed. Error detection and correction is performed on this alternate link 114, similar to the error detection and correction performed on other critical links in the system. Preventive maintenance is performed when the error rate exceeds a threshold value.

Figure 3:
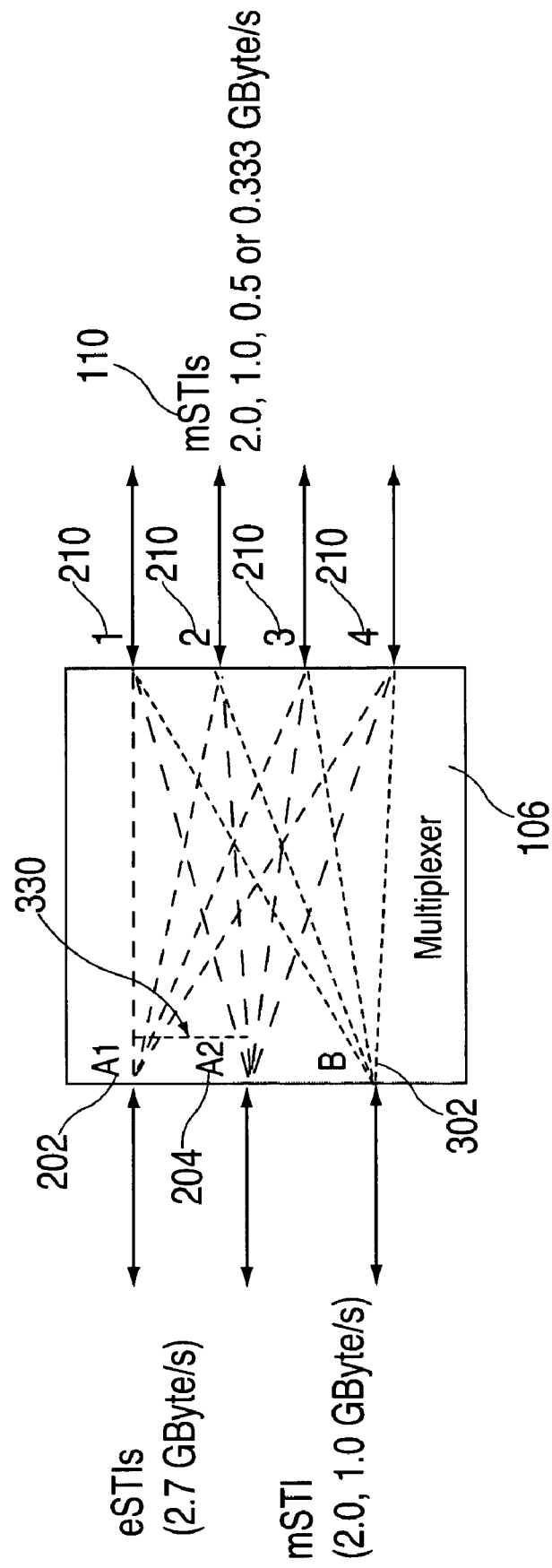
FIG. 3 depicts a dual port multiplexer data flow that may be utilized by exemplary embodiments of the present invention.

FIG. 3 depicts the data flow of a dual port multiplexer 106 that may be utilized by exemplary embodiments of the present invention. The multiplexer 106 accepts the 2.7 Gbytes/s eSTI link 108 (via cable) into port A1 202 and into port A2 204 from the processor node 102 via the alternate link 114 and provides an mSTI I/O link capability of 2.0, 1.0, 0.5 and 0.333 Gbytes/s via the downstream ports 210 to each I/O card slot in the I/O cage 116. The downstream link mSTI speeds are individually selectable via firmware for any I/O card 112. For example, the four downstream ports 210 may be configured to execute at 2, 1, 0.5 and 0.333 Gbytes/s or 2, 1, 1, and 0.5 Gbytes/s, respectively. An additional upstream mSTI port 302 is provided to enable cascading of multiplexers.

If processor node two 102b is removed, the I/O hub is under repair, or the cable connection between processor node two 102b and/or the "Q" multiplexer 106c fails, then the I/O will be redirected. The machine will reconfigure the I/O traffic to the I/O attached to the "Q" multiplexer 106c via the path: processor node four 102d, the "R" multiplexer 106d port A2 208, "R" multiplexer internal connection 330 (illustrated in FIG. 3), and the direct connected alternate link 114 between the "R" multiplexer 106d (i.e., via port A1 206) and the "Q" multiplexer 106c (i.e., via port A2 204), illustrated in FIG. 2. The "R" multiplexer 106d will transfer the transactions from port A2 208 to either an mSTI downstream port 110 within the "R" multiplexer 106d or to port A1 206 for transmission to the "Q" multiplexer 106c (i.e., the other multiplexer 106 in the pair) for transfer to the appropriate mSTI link 110 in the "Q" multiplexer 106c.

The routing of transaction packets is based on the packet addresses that are associated with a particular mSTI link 110 on a multiplexer 106. The converse is also true of data entering the mSTI downstream port 210 from the downstream I/O card resources to be transmitted to the appropriate processor node 102. Both normal and failover configurations are automatically sensed, appropriately configured, and path selection and addresses updated without customer intervention. This is an exemplary recovery scenario. The original configuration and paths are retained so that the server may be returned to its original state once the repair is complete.

An exemplary embodiment of the present invention provides a second level of multiplexing for I/O cards 112 by allowing 2.0 and 1.0 Gbytes/s STI input (via port B 302 in FIG. 3) to be multiplexed to the four 2.0, 1.0, 0.5 or 0.333 Gbytes/s mSTI downstream ports 210. This also allows attachment of older lower speed I/O cards, thereby, reducing development cost and allowing the system owner to use already purchased older I/O cards. This capability enables fan-out of the data to particular adapter port on the I/O cards, thereby achieving a total connectivity fan-out of 16 to 1. For example, one eSTI link 108 can be driven to 16 final I/O card adapters.

Figure 4:
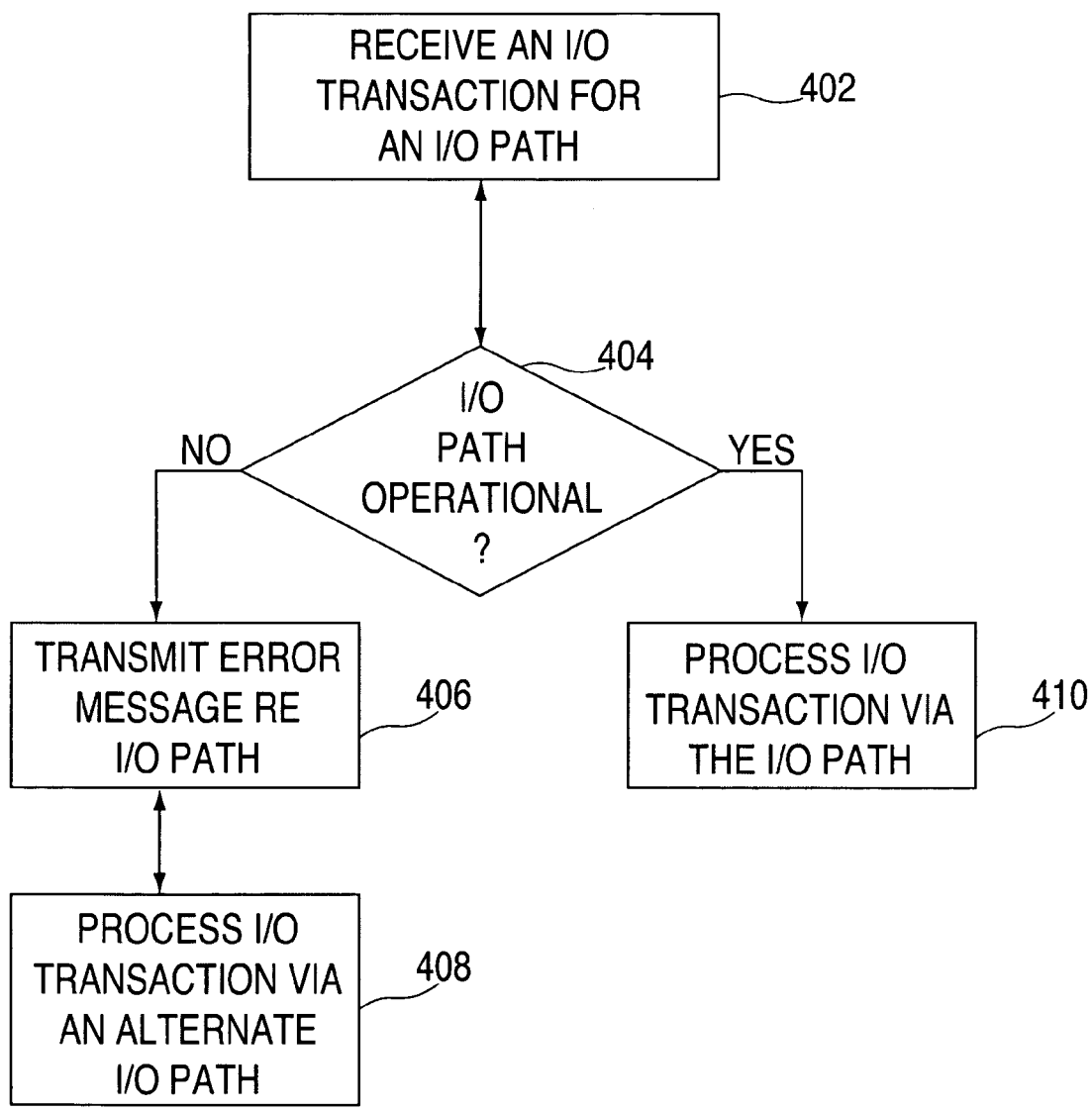
FIG. 4 depicts a process flow that may be implemented by exemplary embodiments of the present invention.

FIG. 4 depicts a process flow that may be implemented by exemplary embodiments of the present invention. At step 402, an I/O transaction from a processor node 102 is received and specifies an I/O path. At step 404, a check is made to determine if the I/O path is operational (e.g., is the MBA ASIC 104 in the I/O path operational). If the path is operational, then step 410 is performed and the I/O transaction is processed via the primary I/O path. The I/O transaction is routed via the MBA ASIC 104 to a multiplexer 106 and then to an I/O card. Step 406 is performed if the I/O path is not operational, as determined at step 404. At step 406, an error message is transmitted to alert the processor node 102, or other error correction system, of the not operational I/O path. Then, at step 408, the I/O transaction is processed via an alternate I/O path. As described previously herein, the alternate I/O path includes transmitting/receiving the I/O transaction via an alternate port and alternate link 114 in a multiplexer 106 to the I/O card.

Alternatively, if a path failure occurs, the processor is notified and an alternate path is used (having been predefined) for all transaction associated with the I/O cards affected. Upon repair or correction of the fault condition the system returns to the primary path configuration.

Exemplary embodiments of the present invention may be utilized to support concurrent processor node or I/O hub removal without disconnecting the attached I/O ports. This may lead to increased customer satisfaction due to the availability of more I/O resources during the repair service interval.

As described above, the embodiments of the invention may be embodied in the form of computer-implemented processes and apparatuses for practicing those processes. Embodiments of the invention may also be embodied in the form of computer program code containing instructions embodied in tangible media, such as system memory, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic events.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for providing redundant I/O access between a plurality of interconnected processor nodes and I/O resources, the method comprising:

determining whether a primary path between the interconnected processor nodes and the I/O resources is operational, the primary path including a first processor node, and a primary multiplexer, wherein the primary multiplexer is attached to the I/O resources, and the primary multiplexer includes a primary link port;

routing transactions via the primary path in response to determining that the primary path is operational;

routing the transactions between the interconnected processor nodes and the I/O resources attached to the primary multiplexer via an alternate path in response to determining that the primary path is not operational, the alternate path including a second processor node and an alternate multiplexer, wherein the alternate multiplexer includes an alternate link port connected to the primary link port via an alternate link, and the second processor node accesses the I/O resources attached to the primary multiplexer via the alternate multiplexer through the alternate link; and transmitting idle sequence traffic on the alternate link on a continuous basis while the primary path is operational in routing the transactions in a normal mode of operation, the idle sequence traffic verifying availability of the alternate link prior to routing the transactions via the alternate path.

2. The method of claim 1 wherein error detection and correction are performed on the alternate link, and preventative maintenance is performed in response to determining that an error rate exceeds a threshold value.

3. The method of claim 1 wherein the determination of whether the primary path is operational and the routing transactions via the primary path or via the alternate path are performed without human intervention.

4. The method of claim 1 wherein the determination of whether the primary path is operational and the routing transactions via the primary path or via the alternate path are transparent to the I/O resources.

5. The method of claim 1 wherein a recovery action that transparently reconfigures the transactions to the alternate path has taken place due to a failure condition and a repair of the failure condition transparently reconfigures the transactions to the primary path.

6. A system for providing redundant input/output (I/O) access, the system comprising:
two or more processor nodes including a first processor node and a second processor node, wherein the processor nodes are interconnected by one or more node interconnects for communicating transactions between the processor nodes;
a primary multiplexer including: a primary upstream port, one or more downstream ports, and a primary link port, wherein the primary upstream port is adapted for routing the transactions via the first processor node, and the one or more downstream ports are adapted for routing the transactions to and from I/O resources corresponding to the first processor node via a primary path, the primary path including the first processor node, the primary multiplexer and the I/O resources corresponding to the first processor node; and
an alternate multiplexer including: an alternate upstream port and an alternate link port, wherein the alternate upstream port is adapted for routing the transactions via the second processor node, and the alternate link port is adapted for routing the transactions to and from the I/O resources corresponding to the first processor node via an alternate path, the alternate path including the second processor node, the alternate multiplexer, the alternate link port connected to the primary link port via an alternate link, the primary multiplexer and the I/O resources corresponding to the first processor node, wherein the alternate path is utilized when the primary path is not operational, and idle sequence traffic is transmitted on the alternate link on a continuous basis while the primary path is operational in routing the transactions in a normal mode of operation, the idle sequence traffic verifying availability of the alternate link prior to routing the transactions via the alternate path.

7. The system of claim 6 wherein error detection and correction are performed on the alternate link while it is not actively used for data transmission.

8. The system of claim 7 wherein preventative maintenance is performed in response to determining that an error rate on the alternate link exceeds a threshold value.

9. The system of claim 6 wherein the primary path is not operational when the first processor node is not operational or when a link from the first processor node to the primary multiplexer is not operational.

10. The system of claim 6 wherein a determination of whether the primary path is operational is performed by the system.

11. The system of claim 6 wherein the I/O transactions are routed to the primary path or to the alternate path in a manner that is transparent to the I/O resources.

12. The system of claim 6 wherein the downstream ports communicate with the I/O resources via a multi-speed self-timed interface.

13. The system of claim 6 wherein a link between the primary upstream port and the first processor node comprises an enhanced self-timed interface.

14. The system of claim 6 wherein the primary multiplexer and the alternate multiplexer are implemented by one or more dual port multiplexer/demultiplexer application specific integrated circuits.

15. The system of claim 6 wherein the first processor node and the second processor node are combined to form a single processor node.

16. The system of claim 6 wherein the first processor node includes a first I/O hub for routing the transactions between the first processor node and the primary multiplexer and the second processor node includes a second I/O hub for routing the transactions between the second processor node and the alternate multiplexer.

17. The system of claim 16 wherein the first I/O hub and the second I/O hub are memory bus adapters, and further wherein the two or more processor nodes each include a memory card and a memory subsystem.

18. The system of claim 16 wherein the primary path is not operational when the first I/O hub is not operational or when a link from the first I/O hub to the primary multiplexer is not operational.

19. A storage medium encoded with machine-readable computer program code for providing redundant I/O access between a plurality of interconnected processor nodes and I/O resources, the storage medium including instructions for causing a computer to implement a method comprising:
determining whether a primary path between the interconnected processor nodes and the I/O resources is operational, the primary path including a first processor node, and a primary multiplexer, wherein the primary multiplexer is attached to the I/O resources, and the primary multiplexer includes a primary link port;
routing transactions via the primary path in response to determining that the primary path is operational;
routing the transactions between the interconnected processor nodes and the I/O resources aft ached to the primary multiplexer via an alternate path in response to determining that the primary path is not operational, the alternate path including a second processor node and an alternate multiplexer, wherein the alternate multiplexer includes an alternate link port connected to the primary link port via an alternate link, and the second processor node accesses the I/O resources attached to the primary multiplexer via the alternate multiplexer through the alternate link; and
transmitting idle sequence traffic on the alternate link on a continuous basis while the primary path is operational in routing the transactions in a normal mode of operation, the idle sequence traffic verifying availability of the alternate link prior to routing the transactions via the alternate path.

* * * * *

UNITED STATES PATENT AND TRADEMARK OFFICE
CERTIFICATE OF CORRECTION

PATENT NO. : 7,656,789 B2  Page 1 of 1
APPLICATION NO. : 11/092033
DATED : February 2, 2010
INVENTOR(S) : Alves et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 839 days.

Signed and Sealed this

Thirtieth Day of November, 2010

David J. Kappos
*Director of the United States Patent and Trademark Office*